Aug. 7, 1934.  C. W. STONE  1,969,676
SYSTEM OF ELECTRICAL DISTRIBUTION
Filed Jan. 27, 1933
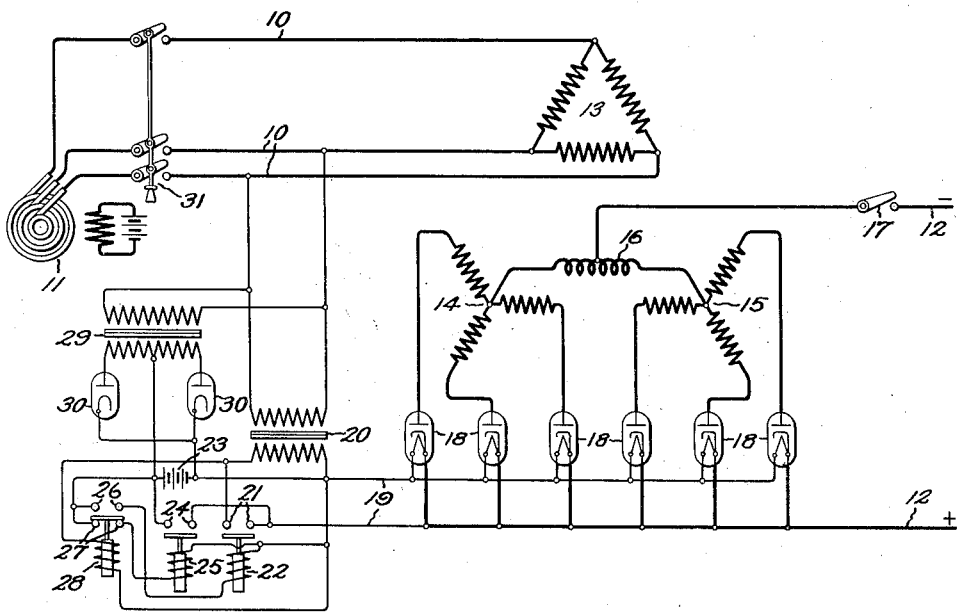
Inventor:
Charles W. Stone.
by Chas. E. Tullar
His Attorney.

Patented Aug. 7, 1934

1,969,676

UNITED STATES PATENT OFFICE 1,969,676

SYSTEM OF ELECTRICAL DISTRIBUTION

Charles W. Stone, Schenectady, N. Y., assignor to General Electric Company, a corporation of New York Application January 27, 1933, Serial No. 653,853

7 Claims. (Cl. 175—363)

My invention relates to systems of electrical distribution, and more particularly to such systems for transmitting energy from a supply circuit to a load circuit, and including an electric valve provided with a thermionic cathode.

It has now become common practice in many metropolitan areas to supply energy to congested direct current districts from an alternating current feeder circuit through some rectifying apparatus, such for example, as a motor generator, a rotary converter, or an electric valve rectifier. The synchronous motor generator or rotary converter are subject to the disadvantage that, in case of a failure on the alternating current feeder circuit, it becomes very difficult to start and synchronize the synchronous machinery under load. It has been common practice to provide a stand-by battery for supplying energy to the direct current network during the period of deenergization of the alternating current feeder circuit, which ordinarily is a very short interval, and during the time required to start up and synchronize the rotating apparatus, which may extend over a considerable length of time. The use of rotary converting apparatus in such a system involves the additional difficulty of reducing the voltage of the rotary converter, which is fixed by the alternating current supply voltage, to approximately the voltage of the stand-by battery, which may be considerably below normal in case the battery has been operating for any considerable period. The use of rectifiers including thermionic electric valves of the gaseous discharge type has been found particularly advantageous in such cases since the cost of such apparatus compares favorably with that of synchronous converting apparatus in installations of a size where a mercury arc rectifier is uneconomical. It is well known, however, that a definite interval of time is required for heating the cathodes of such devices before they can be satisfactorily placed in operation and, in the case of electric valves of considerable power rating, this time interval may amount to thirty minutes or more. Without some special arrangement it becomes necessary, upon the failure of the alternating current feeder circuit, to maintain the electric valve rectifying apparatus out of operation for the full period normally required to bring the cathode to operating temperature from a cold state, to insure against damage to the electric valve. Obviously, it is undesirable to maintain such a rectifying apparatus out of service for as much as thirty minutes when the outage on the alternating current feeder circuit may last for an interval of only a minute or less.

It is an object of my invention, therefore, to provide an improved system of electric distribution for transmitting energy from a supply circuit to a load circuit and including an electric valve provided with a thermionic cathode, which will overcome the above mentioned difficulties and which will be simple and reliable in operation.

It is another object of my invention to provide an improved system of electrical distribution for transmitting energy from a supply circuit to a load circuit and including an electric valve provided with a thermionic cathode in which the thermionic cathode will be maintained at a proper operating temperature under all conditions of service.

It is a further object of my invention to provide an improved system of electrical distribution in which there is provided means for transmitting energy from a supply circuit to a load circuit including an electric valve provided with a thermionic cathode, and in which the cathode is maintained at a proper operating temperature upon a failure of the supply circuit.

In accordance with one embodiment of my invention, a direct current circuit is connected to be energized from an alternating current circuit through an electric valve rectifying apparatus including a plurality of valves having thermionic cathodes and preferably being of the gaseous discharge type. The cathodes of the several electric valves are connected to be energized normally from the alternating current supply circuit through a cathode heating transformer. There is also provided an auxiliary source of energy, such for example, as a relatively small stand-by battery, and there is provided means responsive to the failure of the alternating current supply circuit for transferring the cathode heating circuits of the several electric valves from the alternating current supply circuit to the auxiliary source. If desired, there may be provided an auxiliary rectifier for normally maintaining a maximum charge on the battery.

For a better understanding of my invention, together with other and further objects thereof, reference is had to the following description taken in connection with the accompanying drawing and its scope will be pointed out in the appended claims. The single figure of the accompanying drawing illustrates an apparatus embodying my invention for transmitting energy from a three-phase alternating current supply circuit to a direct current load circuit.

Referring now more particularly to the drawing, there is illustrated a system of electrical distribution for transmitting energy from a three-phase alternating current circuit 10 energized from a synchronous generator 11 to a direct current circuit 12. This system includes a rectifying apparatus which may be of any of the several types well known in the art, although I have illustrated by way of example a double three-phase rectifying apparatus comprising a three-phase primary transformer network 13 connected to the alternating current circuit 10 and a pair of three-phase secondary transformer networks 14 and 15. The electrical neutrals of the networks 14 and 15 are connected to the negative side of the direct current circuit 12 through opposite halves of an interphase inductive winding 16 and a switch means 17. The several end terminals of the networks 14 and 15 are connected to the positive side of the direct current circuit 12 through the several electric valves 18, each provided with a thermionic cathode which may be either of the directly heated filamentary, or indirectly heated, type, although the indirectly heated type has been diagrammatically illustrated by way of example. The electric valves 18 preferably operate with a gaseous discharge. The cathode heaters of the several electric valves 18 may be connected to a common cathode heating circuit 19 which is adapted to be energized from the alternating current circuit 10 through a cathode heating transformer 20 and the contacts 21 of a relay 22, or from an auxiliary source of energy, such as a battery 23, through the contacts 24 of a relay 25. The relays 22 and 25 are adapted to be selectively energized through the normally open contacts 26 and the normally closed contacts 27, respectively, of a relay 28, the coil of which is energized from the secondary winding of the cathode heating transformer 20 and is thus responsive to the energization of the alternating current circuit 10. However, it will be understood that, in case the contacts of the relay 28 have sufficient current carrying capacity to handle the cathode heating current of the several electric valves 18, the auxiliary relays 22 and 25 may be omitted and the cathode heating circuit 19 selectively energized from the transformer 20 or from the battery 23 through the contacts 26 and 27, respectively. There is also provided an auxiliary rectifying means comprising a transformer 29 and electric valves 30, connected in a conventional manner for securing full wave rectification, for maintaining a substantially maximum charge on the battery 23. The circuit controlling apparatus normally included in such a system of electrical distribution and operated either manually or automatically in response to predetermined circuit conditions, has been illustrated diagrammatically as a switching means 31.

In explaining the operation of the above described apparatus, it will be assumed that, initially, the circuit controlling means 31 is in its open position, as illustrated, and that the battery 23 is fully charged. Under these conditions the operating coil of the relay 25 is energized from the battery 23 through the normally closed contacts 27 of the relay 28 and the relay 25 operates to energize the cathode heating circuit 19 directly from the battery 23. By this means the several cathode heaters of the electric valves 18 are maintained at proper operating temperature so that, when the circuit controlling means 31 is operated to its closed position, electric valves 18 will be in a condition to supply current to the direct current circuit 12. Upon the operation of the circuit controlling means 31, the relay 28 is energized through the cathode heating transformer 20 and opens its contacts 27, deenergizing the relay 25, and closes its contacts 26, energizing the relay 22. As the relay 25 drops out it disconnects the cathode heating circuit 19 from the battery 24 and at the same time the relay 22 operates to connect the cathode heating circuit directly to the secondary winding of the cathode heating transformer 20, thus maintaining a continuity of supply for the cathode heaters of the several electric valves 18. Any charge withdrawn from the battery 23 during the starting operation will be renewed by the auxiliary rectifying apparatus comprising the transformer 29 and electric valves 30, which may take the form of the well known trickle charger.

Obviously, upon a failure on the alternating current circuit 10, for any cause, the cathode heating transformer 20 will be deenergized and the reverse operation will take place, the cathode heating circuit 19 again being energized from the battery 23 to maintain the cathodes of the several electric valves 18 at a proper operating temperature.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A system of electrical distribution comprising a power supply circuit, a load circuit, means for transmitting energy therebetween including an electric valve provided with a thermionic cathode, a circuit for normally heating said cathode from said supply circuit, and means for maintaining said cathode at an operating temperature upon a failure of said supply circuit comprising an auxiliary source of energy, and means responsive to the failure of said supply circuit for energizing said cathode from said auxiliary source.

2. A system of electrical distribution comprising a power supply circuit of relatively large capacity, a load circuit, means for transmitting energy therebetween including an electric valve provided with a thermionic cathode, a circuit for normally heating said cathode from said supply circuit, and means for maintaining said cathode at an operating temperature upon a failure of said supply circuit comprising a relatively low capacity auxiliary source of energy insufficient for energizing said load circuit, and means responsive to the failure of said supply circuit for energizing said cathode from said auxiliary source.

3. A system of electrical distribution comprising a power supply circuit of relatively large capacity, a load circuit, means for transmitting energy therebetween including an electric valve provided with a thermionic cathode, a circuit for normally heating said cathode from said supply circuit, and means for maintaining said cathode at an operating temperature upon a failure of said supply circuit comprising an energy storage device of relatively low capacity, means for normally storing energy in said device from said supply circuit, and means responsive to the failure of said supply circuit for energizing said cathode from said energy storage device.

4. A system of electrical distribution comprising a power supply circuit of relatively large capacity, a load circuit, means for transmitting energy therebetween including an electric valve provided with a thermionic cathode, a circuit for normally heating said cathode from said supply circuit, and means for maintaining said cathode at an operating temperature upon a failure of said supply circuit comprising a battery of relatively low capacity, an auxiliary rectifier for normally charging said battery from said supply circuit, and means responsive to the failure of said supply circuit for energizing said cathode from said energy storage device.

5. A system of electrical distribution comprising a power supply circuit, a load circuit, means for transmitting energy therebetween including an electric valve provided with a thermionic cathode, an auxiliary source of energy, relay means responsive to the energization of said supply circuit and provided with normally open contacts for controlling the heating of said cathode from said supply circuit and normally closed contacts for controlling the heating of said cathode from said auxiliary source.

6. A system of electrical distribution comprising a power supply circuit, a load circuit, means for transmitting energy therebetween including an electric valve provided with a thermionic cathode, an auxiliary source of energy, a first relay means for energizing said cathode from said supply circuit, a second relay means for energizing said cathode from said auxiliary source, and a third relay means responsive to the energization of said supply circuit for selectively energizing said first and second relay means.

7. A system of electrical distribution comprising a power supply circuit, a load circuit, means for transmitting energy therebetween including an electric valve provided with a thermionic cathode, an auxiliary source of energy, a first relay means for energizing said cathode from said supply circuit, a second relay means for energizing said cathode from said auxiliary source, and a voltage responsive relay energized from said supply circuit and provided with normally open contacts for energizing said first relay means from said supply circuit and normally closed contacts for energizing said second relay means from said auxiliary source.

CHARLES W. STONE.